(12) United States Patent
Diestelhorst et al.

(10) Patent No.: US 10,810,039 B2
(45) Date of Patent: Oct. 20, 2020

(54) MONITORING UTILIZATION OF TRANSACTIONAL PROCESSING RESOURCE

(71) Applicant: ARM LIMITED, Cambridge (GB)

(72) Inventors: Stephan Diestelhorst, Cambridge (GB); Matthew James Horsnell, Cambridge (GB)

(73) Assignee: ARM Limited, Cambridge (GB)

( * ) Notice: Subject to any disclaimer, the term of this patent is extended or adjusted under 35 U.S.C. 154(b) by 184 days.

(21) Appl. No.: 15/537,015

(22) PCT Filed: Nov. 24, 2015

(86) PCT No.: PCT/GB2015/053570
§ 371 (c)(1),
(2) Date: Jun. 16, 2017

(87) PCT Pub. No.: WO2016/097681
PCT Pub. Date: Jun. 23, 2016

(65) Prior Publication Data
US 2017/0329627 A1 Nov. 16, 2017

(30) Foreign Application Priority Data
Dec. 19, 2014 (GB) .................................. 1422794.6

(51) Int. Cl.
*G06F 9/46* (2006.01)
*G06F 9/38* (2018.01)
*G06F 11/36* (2006.01)

(52) U.S. Cl.
CPC ............ *G06F 9/467* (2013.01); *G06F 9/3842* (2013.01); *G06F 11/362* (2013.01)

(58) Field of Classification Search
CPC ....... G06F 9/467; G06F 9/3842; G06F 11/362
(Continued)

(56) References Cited

U.S. PATENT DOCUMENTS

2009/0031066 A1* 1/2009 Bansal .................. G06F 9/5011
710/113
2009/0240742 A1 9/2009 Burghard et al.
(Continued)

FOREIGN PATENT DOCUMENTS

| CN | 103257933 | 8/2013 |
|---|---|---|
| CN | 103475520 | 12/2013 |

(Continued)

OTHER PUBLICATIONS

International Search Report for PCT/GB2015/053570, dated May 11, 2016, 5 pages.
(Continued)

*Primary Examiner* — Hua J Song
(74) *Attorney, Agent, or Firm* — Nixon & Vanderhye P.C.

(57) ABSTRACT

An apparatus (2) may have a processing element (4) for performing data access operations to access data from at least one storage device (10, 12, 14). The processing element may have at least one transactional processing resource (10, 18) supporting processing of a transaction in which data accesses are performed speculatively following a transaction start event and for which the speculative results are committed in response to a transaction end event. Monitoring circuitry (30) captures monitoring data indicating a degree of utilization of the transactional processing resource (10, 18) when processing the transaction.

22 Claims, 4 Drawing Sheets (58) Field of Classification Search
USPC .......................................................... 711/100
See application file for complete search history.

(56) References Cited

U.S. PATENT DOCUMENTS

| | | |
|---|---|---|
| 2010/0138571 A1 | 6/2010 | Cain, III et al. |
| 2011/0145498 A1 | 6/2011 | Taillefer et al. |
| 2012/0030518 A1 | 2/2012 | Rajwar et al. |
| 2012/0079246 A1 | 3/2012 | Breternitz, Jr. et al. |
| 2014/0195787 A1 | 7/2014 | Scalabrino et al. |
| 2014/0281236 A1* | 9/2014 | Rash .................. G06F 9/467 711/122 |
| 2014/0317265 A1 | 10/2014 | James et al. |

FOREIGN PATENT DOCUMENTS

| | | |
|---|---|---|
| CN | 104050023 | 9/2014 |
| CN | 104113585 | 10/2014 |
| WO | 2007/115003 | 10/2007 |
| WO | WO 2013/186272 | 12/2013 |

OTHER PUBLICATIONS

Written Opinion of the ISA for PCT/GB2015/053570, dated May 11, 2016, 11 pages.
Search Report for GB 1422794.6, dated Jun. 19, 2015, 7 pages.
Stevens: "Introduction to AMBA", https://www.arm.com/files/pdf/CacheCoherencyWhitepaper_6June2011.pdf, (Jul. 2013).
Pieper et al. "High level cache simulation for heterogeneous multiprocessors", *Design Automation Conference*, pp. 287-292, (Jul. 2004).
First Office Action for CN Application No. 201580066445.2 dated Apr. 3, 2020 and English translation, 16 pages.

* cited by examiner

MONITORING UTILIZATION OF TRANSACTIONAL PROCESSING RESOURCE

This application is the U.S. national phase of International Application No. PCT/GB2015/053570 filed 24 Nov. 2015, which designated the U.S. and claims priority to GB Patent Application No. 1422794.6 filed 19 Dec. 2014, the entire contents of each of which are hereby incorporated by reference.

The present technique relates to the field of data processing.

A data processing apparatus may support the processing of transactions in which a number of data access operations following a transaction start event are performed speculatively, and the results of the speculative operations are committed in response to a later transaction end event.

Viewed from one aspect, the present technique provides an apparatus comprising:

a processing element to perform data access operations to access data from at least one storage device;

wherein the processing element has at least one transactional processing resource supporting processing of a transaction in which the data access operations following a transaction start event are performed speculatively and results of the speculatively performed data access operations are committed in response to a transaction end event; and the apparatus comprises monitoring circuitry to capture monitoring data indicative of a degree of utilization of said at least one transactional processing resource when processing said transaction.

Viewed from another aspect, the present technique provides an apparatus comprising:

processing means for performing data access operations to access data from at least one storage device means for storing data;

wherein the processing means has at least one transactional processing resource means for supporting processing of a transaction in which the data access operations performed following a transaction start event are performed speculatively and results of the speculatively performed data access operations are committed in response to a transaction end event; and the apparatus comprises monitoring means for capturing monitoring data indicative of a degree of utilization of said at least one transactional processing resource means when processing said transaction.

Viewed from a further aspect, the present technique provides a data processing method comprising:

in response to a transaction start event indicating a start of a transaction, speculatively performing one or more data access operations for accessing data in at least one storage device;

in response to a transaction end event indicating an end of the transaction, committing results of the speculatively performed data access operations of the transaction; and capturing monitoring data indicative of a degree of utilization of at least one transactional processing resource during processing of the transaction.

Viewed from another aspect, the present technique provides an apparatus comprising:

a processing element to perform data access operations to access data from at least one storage device;

a plurality of state storage elements to store state data; and restoration storage circuitry to store restoration data for restoring previous state data to at least one of the state storage elements;

wherein the processing element supports processing of a transaction in which the data access operations following a transaction start event are performed speculatively, results of the speculatively performed data access operations are committed in response to a transaction end event, and when an abort event occurs before the transaction end event, a restoration operation is performed to restore the previous state data to said at least one of the state storage elements based on the restoration data stored in the restoration storage circuitry;

wherein the restoration storage circuitry has capacity for storing restoration data for fewer state storage elements than the total number of said plurality of state storage elements.

Viewed from another aspect, the present technique provides an apparatus comprising:

processing means for performing data access operations to access data from at least one storage means for storing data;

a plurality of state storage element means for storing state data; and restoration storage means for storing restoration data for restoring previous state data to at least one of the state storage element means;

wherein the processing means supports processing of a transaction in which the data access operations performed following a transaction start event are performed speculatively, results of the speculatively performed data access operations are committed in response to a transaction end event, and when an abort event occurs before the transaction end event, a restoration operation is performed to restore the previous state data to said at least one of the state storage element means based on the restoration data stored in the restoration storage means;

wherein the restoration storage means has capacity for storing restoration data for fewer state storage elements than the total number of said plurality of state storage elements.

Viewed from another aspect, the present technique provides a data processing method for an apparatus comprising a plurality of state storage elements, the method comprising:

in response to a transaction start event indicating a start of a transaction, speculatively performing one or more data access operations for accessing data in at least one storage device;

storing restoration data for restoring previous state data to at least one of the state storage elements;

in response to a transaction end event indicating an end of the transaction, committing results of the speculatively performed data access operations of the transaction; and when an abort event occurs before the transaction end event, performing a restoration operation using the restoration data to restore the previous state data to said at least one of the state storage elements;

wherein restoration storage circuitry for storing the restoration data has capacity for storing restoration data for fewer state storage elements than the total number of said plurality of state storage elements.

Further aspects, features and advantages of the present technique will be apparent from the following description of examples, which is to be read in conjunction with the accompanying drawings, in which.

A processing element may have at least one transactional processing resource which supports processing of transactions. The transactional processing resource may be provided within the processing element or as an external resource which the processing element can access. The utilization of the resource may vary from transaction to transaction. Sometimes the transaction may only require a fraction of the available transactional processing resource while other transactions may use the resource more fully. Monitoring circuitry is provided to capture monitoring data indicative of a degree of utilization of the at least one transactional processing resource by the processing element when processing a transaction. This monitoring data can be useful for a range of purposes such as scheduling of operations on the processing element, or debugging of the processing element when carrying out transactions.

The start and end of a transaction may be indicated by a transaction start event and a transaction end event respectively. The data processing operations performed between the transaction start event and transaction end event may be performed speculatively so that their results are not committed until the transaction end event occurs. The transaction start and end events may occur in various ways, such as when an external signal is received, or when a particular register is accessed. However, in one example, the transaction start event and transaction end event may occur when a corresponding transaction start instruction or transaction end instruction is executed. In this way, the programmer or compiler can signal the start or end of a transaction using the transaction start/end instructions.

If after the start of a transaction, an abort event occurs before the transaction end event, then the transaction may be aborted and the result of the speculatively performed data access operations may be discarded. The processing element may also reverse changes in state data which have occurred since the start of the transaction. To support this, the apparatus may have state restoration circuitry for storing a backup version of data which can be restored if the abort event occurs during the transaction.

The state restoration data may be saved in different ways. In some cases, all the state restoration data may be saved at the time of the transaction start event. Alternatively, to reduce the storage and processing overhead associated with state saving and restoration, state data need not be saved directly in response to the transaction start event, but as the transaction proceeds, each time a piece of state data is modified the old version of the state data can be saved as state restoration data, so that data which is not modified by the transaction does not need to be saved.

There may be a number of reasons for abort events. One reason may be a detected conflict. For example, transactions may be used to ensure that a set of operations is performed atomically, so that no other process can update the data accessed in the transaction while the transaction is ongoing. If another process attempts to access the same address as an address accessed in the transaction, a conflict may be detected and an abort event may be triggered, to abort the transaction and perform the state restoration. In this way, the transaction is allowed to complete if no conflict is detected during the transaction. To support conflict detection, the apparatus may have conflict detection circuitry for detecting conflicts, for example by storing a record of the addresses which have been accessed in the transaction and triggering an abort event if another data access attempts to access the same address.

Hence, transaction processing may require various resources to be provided, such as storage or circuitry for maintaining state restoration data, tracking speculative results of processing operations, or tracking conflicts. The monitoring circuitry may capture monitoring data indicating the utilization of any of these types of resources.

For example, the transactional processing resource may include speculative result tracking circuitry for storing tracking data indicating speculative results of data access operations for the transaction. For example, the speculative result tracking circuitry may comprise a cache (which could be a dedicated cache for speculative results or a shared cache which also stores non-speculative data). The monitoring data may capture various information about the utilization of the speculative result tracking circuitry (cache).

For example, the number of storage locations of the cache used for storing tracking data for the transaction may be recorded (this could be represented using an absolute number of storage locations, or as a percentage or fraction of the total capacity of the cache). Also, if the cache is set-associative, the monitoring circuitry may detect a number of sets used for storing the speculative result tracking data, or a number of ways within a set used for the tracking data. In particular, the maximum number of sets or ways used over the course of the transaction may be recorded. This can be useful for determining whether a larger cache or a cache with higher associativity is required for carrying out the transaction, or whether it would be possible to process the transaction with a smaller cache or cache with lower associativity.

Another example of monitoring data captured may be data indicating what fraction of the speculative results tracked by the speculative result tracking circuitry relate to read operations or write operations. Some processing elements may have a compression mechanism (e.g. a Bloom filter) which can be used to compress the speculative results of a number of read operations into a smaller amount of data, but this may not be possible for write operations. By capturing data indicating whether the speculative data for a particular transaction is dominated by reads or dominated by writes, this can be useful for determining whether it would be more efficient to execute the transaction using a processing element having the compression mechanism. For example, the monitoring data may indicate what fraction of the tracking data relates to reads, what fraction relates to writes, or may indicate a ratio of reads-to-writes, or some other parameter indicating the balance between reads or writes.

Another example of a transactional processing resource may be restoration storage circuitry for storing restoration data indicating previous versions of state data of the processing element, which may be restored if an abort event occurs. The monitoring circuitry may track utilization of the restoration storage circuitry, for example by indicating how many storage elements of the restoration storage circuitry have been used for a transaction, or how many storage elements (e.g. registers) of the processing element have had their state saved to the restoration storage circuitry. This can be useful for determining whether a given transaction requires a processing element with larger restoration storage circuitry or could be executed with less capacity for restoration storage.

In some cases, the transaction may be processed by the processing element using the transactional processing resource. Hence, during the transaction the data access operations performed by the processing element may be performed speculatively, until the transaction is aborted or the transaction ends. The transactional processing resource may be any resource used by the processing element to support processing of the transaction, such as the various types of data storage discussed above.

However, in other examples the transactional processing resource may itself process the transaction, not the processing element. For example, the transactional processing resource may be a transaction handling processing element or transaction accelerator which is dedicated to processing transactions and comprises the various types of storage discussed above for supporting processing of the transaction. In this case, the processing element on encountering a transaction start event may request that the transactional processing resource processes the transaction on its behalf, and the transactional processing resource may then execute the speculative data access operations during processing of the transaction. Utilization of various transactional processing resources provided by the transaction handling processing element or transaction accelerator may be monitored by the monitoring circuitry.

The monitoring data captured by the monitoring circuitry may be used for various purposes within the apparatus.

In one example, the monitoring data may be used to determine whether a group of required data access operations should be processed as a transaction using the at least one transactional processing resource, or should instead be processed with a different processing mechanism. For example, if a given transaction has a relatively low utilization of the transactional processing resource then it may be more efficient to process the transaction using another technique, to save the overhead associated with tracking speculative results, state saving/restoration or conflict detection, for example. For example, an alternative processing mechanism may be to use locks to ensure exclusive access to the required data, and then execute the processing using the locked data non-speculatively without the transactional processing resource. For example, a control program executing within the apparatus may determine whether the usage of the resource for a previous instance of the transaction exceeds a certain threshold required to make processing of transactions viable, and if the usage is less than the threshold, then on a subsequent execution of the same operations, the operations may be performed with a mechanism other than the transaction-based mechanism.

Another example use for the monitoring data may be for debugging. For example, the monitoring data may be stored to a debug buffer on-chip, or output over a debug interface, so that a debugger can access the monitoring data. The debugger may be able to inject debugging instructions into the execution pipeline to control the processing element to carry out certain test actions, and then observe various properties of the apparatus, including the monitoring data tracking utilization of the transactional processing resource, in order to determine how the processing element is functioning, or to identify potential problems. For example, if the debugging causes a transaction to be performed, which is then aborted, the cause of the abort may not be apparent. One potential reason for an abort may be that there was insufficient transactional processing resource for processing the transaction, e.g. the transaction generated so much speculative data that there is no more space for tracking any more speculative results, triggering an abort when another speculative result is to be stored. By making the monitoring data indicating the degree of utilization of the at least one transactional processing resource accessible to the debugger, this can help the debugger to determine whether insufficient transactional processing resource was the cause of the abort, or whether the abort was caused by other reasons (e.g. an address conflict).

Some systems may only have one processing element which can carry out transactions, and the use cases for the monitoring data discussed above may be useful for such systems.

However, the monitoring circuitry may be particularly useful in a system having multiple processing elements. For example, the processing elements may be heterogeneous so that they have different amounts of transactional processing resource. For example, one processing element may have more space for storing speculative results of data access operations than another (e.g. a larger cache). Also, one processing element may have a speculative result cache with greater associativity than the cache of another processing element (which may affect at what point a transaction aborts due to insufficient resource). Also, different processing elements may have different amounts of state restoration storage available for backing up saved versions of state. It may be more efficient to schedule transactions on a processing element having less resource if this is sufficient for handling the transactions, so that a processing element with more resource can be saved for transactions which actually need more resource.

Therefore, the scheduling of transactions of the processing elements may be performed using the monitoring data. The scheduling may also take account of how much transactional processing resource each processing element has. For example, a storage element (e.g. a control register) may include data specifying the amount of resource for each processing element (e.g. the size/associativity of its cache). A control program (e.g. an application, operating system or hypervisor) executing on one of the processing elements may select which processing element should process a selected transaction based on the monitoring data and/or the data defining the resources available to each processing element.

For example, if the monitoring data indicates that, on a previous instance of processing a selected transaction using a first processing element, the utilization of the transactional processing resource by the first processing element was less than a given threshold, then the control program may schedule a subsequent instance of the selected transaction using a second processing element which has less transactional processing resource than the first processing element. This conserves the first processing element for processing transactions which require more resource, or can allow the first processing element to be placed in a power saving state. Typically the processing element with more resource may consume more power, so it can be more energy efficient to process transactions with the processing element having the smallest amount of resource capable of processing that transaction.

The monitoring data may be captured separately for each transaction by the monitoring circuitry. Hence, at the start or end of a transaction, the monitoring data may be reset so that fresh monitoring data is captured for a following transaction. The monitoring data captured for each transaction may be stored in a monitoring history store which may for example retain monitoring data for a certain number of recent transactions. For example, each transaction may be identified by the address of its transaction start instruction, or by a transaction identifier, and captured monitoring data may be recorded in the history store in association with the address or transaction identifier. On a subsequent execution of the same transaction, a control program such as an operating system can access the data from the monitoring history store having the corresponding address or identifier, to determine how that transaction should be scheduled.

As mentioned above, an abort event may cause the speculative changes triggered by a transaction to be reversed and state to be restored to a previous value. One use of the monitoring data may be to trigger an abort event to halt processing of the current transaction if the captured monitoring data satisfied a predetermined condition. For example, if the monitoring data indicates that the utilization of the transactional processing resource during the transaction is very low, then it might be more efficient to abort the transaction and perform the required operations using another mechanism which has a lower overhead.

Another reason for triggering an abort event may be if a transaction requires more transactional processing resource than is provided for the processing element carrying out the transaction. The monitoring data could be used to detect this situation.

In another example, a processing element may have restoration storage circuitry for storing restoration data indicating state to be restored if a transaction aborts. The restoration storage circuitry may in some cases have a capacity which is smaller than would be needed to back up data from all the storage elements of the processing element. Hence, if the transaction modifies more than a certain number of storage elements of the processing element then the transaction would abort. It may seem counter-intuitive to limit the amount of restoration storage provided, since this could lead to some transactions aborting which would not abort if the full restoration storage was provided, which might slow down processing. However, in practice, the number of transactions which require a large amount of restoration storage may be relatively small. In a system having multiple processing elements, it may be enough to provide only some of the processing elements with the full restoration storage capability, and to provide at least one other processing element with a more limited capacity of restoration storage circuitry. When a transaction needs the full storage, it can be executed on one of the larger processing elements, but most other transactions which will fit within the restoration storage provided in the smaller processing element can use the smaller processing element. This can make the overall system more energy efficient.

Figure 1:
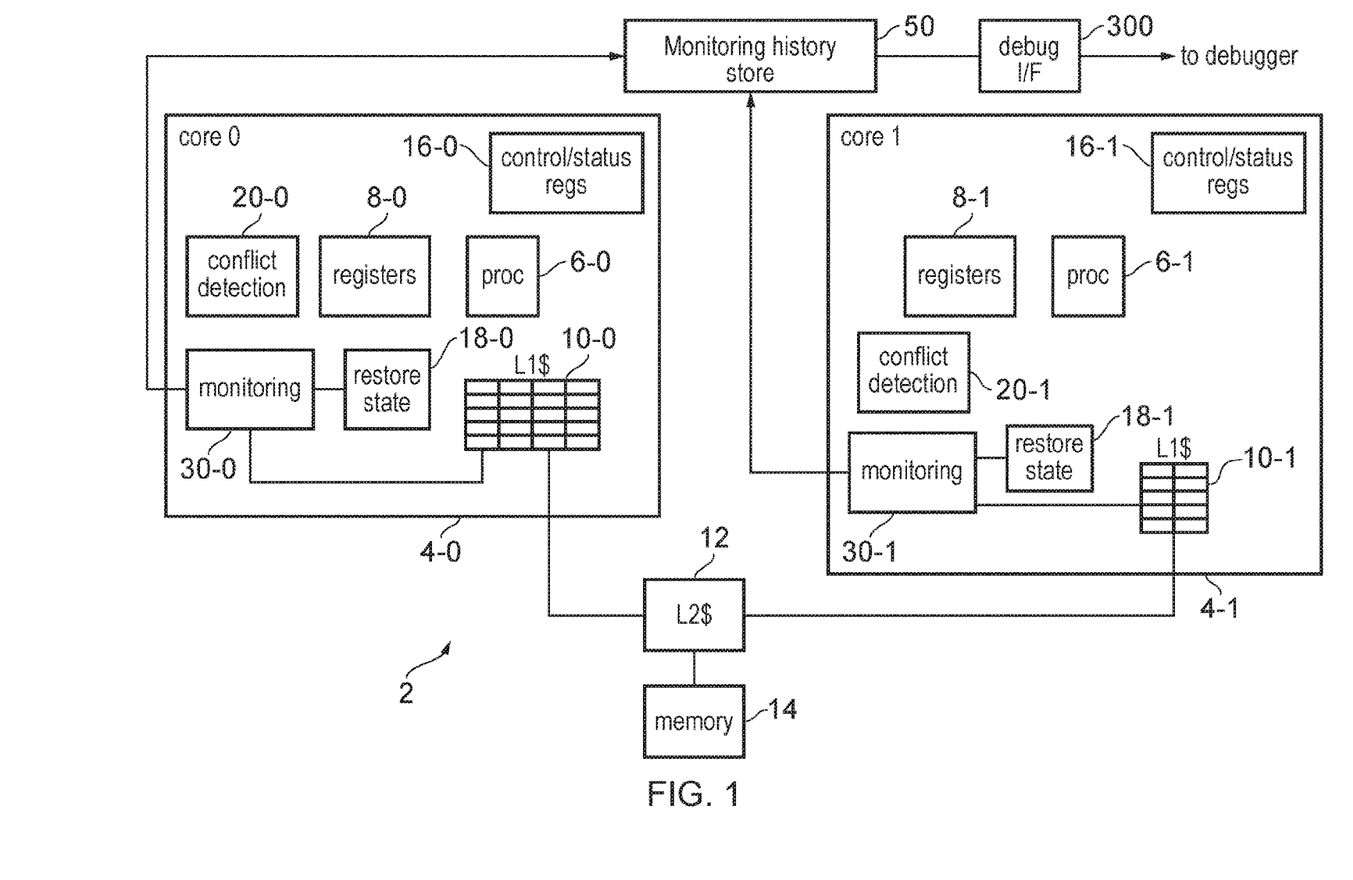
FIG. 1 schematically illustrates an example of a data processing apparatus.

FIG. 1 schematically illustrates an example of a data processing apparatus 2 comprising two processing elements 4-0, 4-1, which in this example are processor cores. Each processing element 4 has processing circuitry 6 for performing data processing operations, a set of registers 8 for storing data values to be processed by the processing circuitry 6, and a level one (L1) cache 10. The L1 cache 10 is for storing cached versions of data from a level two (L2) cache 12 shared between the two processing elements 4 or data from main memory 14. Each core also has control/status registers 16 for storing control or status information indicating properties of the associated processor core 4, or information for configuring operation of the core 4. It will be appreciated that each core may include other elements not illustrated in FIG. 1, that the cores 4-0, 4-1 could have different components, and that the apparatus 2 may include other elements, e.g. more than two processor elements.

The processing elements 4 support processing of transactions. This technique may be referred to as "transactional memory". The transaction starts with a transaction start instruction, and ends with a transaction end instruction. Data access operations performed between the transaction start instruction and transaction end instruction are performed speculatively, and results of the speculatively performed data access operations (e.g. read and write operations) may be stored in the L1 cache 10 of the processing element 4 performing the transaction. The speculative results may be tagged in the cache 10 with a flag indicating that the data is speculative and should not be written back to the L2 cache 12 or memory 14. When the transaction end instruction is encountered, the speculative data in the cache 10 may be marked as non-speculative and any write backs to memory may then proceed.

If an abort event occurs before the transaction end event, then the transaction is aborted, and the speculative data in the L1 cache 10 is discarded or invalidated. Any changes to the register state in registers 8 may be reversed, so that the processing element 4 returns to the condition it had at the time of the transaction start event. State restoration storage 18 (e.g. a second set of registers) may be provided for backing up data from registers 8. For example, data from registers 8 could be saved to the state restoration storage 18 in response to the transaction start instruction, or the saving could be done in a "lazy" manner so that the transaction starts to be processed, and each time a register 8 is updated, the old value of that register is saved to the state restoration storage 18. With the "lazy" state saving approach, it is not necessary to incur an overhead in saving/restoring registers which are not actually modified by the transaction. When the abort event occurs, the state of the registers 8 can be restored using the data stored in the restoration state storage 18.

The abort event could occur for various reasons, e.g. if there is insufficient resource in the L1 cache 10 for storing any further speculative results. However, a common reason for aborts may be the detection of a conflict between a data access performed as part of the transaction and another data access. The core may have conflict detection circuitry 20 which tracks addresses accessed during the transaction, and signals a conflict if another data access which is not part of the transaction (e.g. a data access initiated by the other processing element 4) attempts to access the same address as one of the addresses accessed in the transaction. Transactional memory techniques are often used to maintain exclusive access to data so that a series of operations can be performed atomically without other intervening accesses interfering with the data between the start of the transaction and the end of the transaction. Hence, if a conflict is detected then this may trigger an abort event and the state restoration circuitry 18 may be used to restore states to the registers 8 and the speculative results may be discarded from the L1 cache 10. In this way a transaction may complete successfully only if there are no conflicting data accesses.

Different processing elements may have different amounts of transactional processing resource for supporting the processing of a transaction. For example, as shown in FIG. 1 one processing element 4-0 may have a larger L1 cache 10 than another processing element 4-1. This means the processing element 4-0 can handle more speculative data, but the larger cache may also consume more power.

In another example, one processing element 4-0 may have a cache 10 with a greater associativity than the other processing element 4-1. For instance, cache 10-0 may be a 4-way cache, but cache 10-1 may be a 2-way cache. The associativity is the number of possible locations at which a data value having a particular address can be stored. A cache with a greater associativity will typically consume more energy than a cache with smaller associativity, because when the cache is looked up for a particular address, more locations have their tags compared against a tag portion of the address to determine whether that location stores the required data. However, when processing transactions, if the cache has a greater associativity, the transaction is less likely to abort because it is less likely that all the locations for storing a speculative result with a given address value have already been taken.

Another example of different transactional processing resources may be the state restoration storage 18. One processing element 4 may have greater state restoration storage capacity than another. For example, in some processing elements 4 the state restoration storage may not be able to back up all of the registers 8 of the processing element 4.

Hence, different processing elements may have different resources for processing a transaction. Some status information may be stored within the apparatus (e.g. within the control/status registers 16 of each processing element 4) to indicate what transactional processing resources are available to each processing element 4 (e.g. the size or associativity of the L1 cache 10, or the number of registers which can be backed up in the state restoration storage 18).

Also, each processing element 4 has monitoring circuitry 30 to track the utilization of the transactional processing resources by the corresponding processing element 4 when processing a transaction. The monitoring data may be captured separately for each transaction processed and then stored to a monitoring history store 50 which may be shared between the processing elements. Software executing on one of the processing elements, such as an operating system or hypervisor, can use the monitoring data to control scheduling of transactions and other operations on the respective processing elements 4, so that the available resource can be used more efficiently. For example a transaction may complete on a processing element having a relatively large amount of transactional processing resource, but may not use the full capacity of the resources available. This transaction may be able to run on another processing element with fewer resources. By tracking this using the monitoring circuitry 30, subsequent executions of the same transaction could be migrated to the processing element with less resource, where the transaction may be processed more efficiently (e.g. using a more energy efficient cache).

Figure 2:
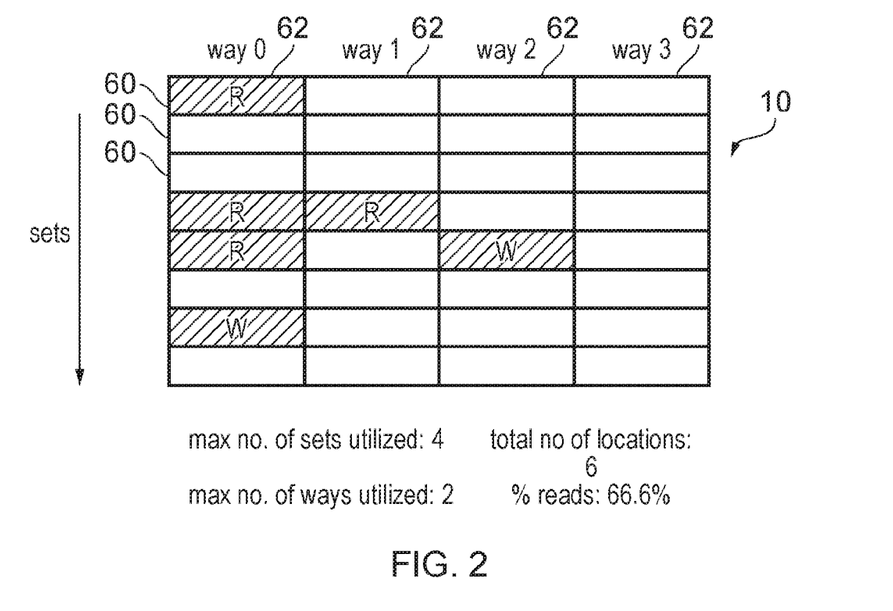
FIG. 2 illustrates an example of monitoring utilization of a speculative result data store.

FIG. 2 shows an example of capturing monitoring data indicating the utilization of the L1 cache 10. In a set-associative cache, each address includes an index portion which identifies a corresponding "set" 60 of locations, and the corresponding data may then be placed in any of those locations. Each location within a given set 60 is referred to as a "way" 62. In the example of FIG. 2, the cache is a 4-way set-associative cache, which means each set comprises 4 locations (ways). A "tag" portion of the address may be stored together with the data value to indicate which of several addresses mapping to the same set is the actual address of the data. When searching the cache for data, the index portion of the address is used to select the corresponding set 60, and the tag portion of the address is compared with the tag portions stored for each way 62 of the selected set 60, to identify whether data is stored in the cache.

As shown in FIG. 2, the monitoring circuitry 30 may track the maximum number of sets 60, or the maximum number of ways 62, used in the L1 cache for storing speculative results during the processing of a transaction. In this example, the number of sets 60 currently used for speculative data is 4, and the maximum number of ways 62 used in a given set is 2. The monitoring circuit 30 may also track the total number of locations used for speculative data (e.g. 6 in this example), or a parameter representing the fraction of speculative data which indicates the result of a read operation or write operation (e.g. in this example two-thirds of the speculative data relates to reads).

Figure 3:
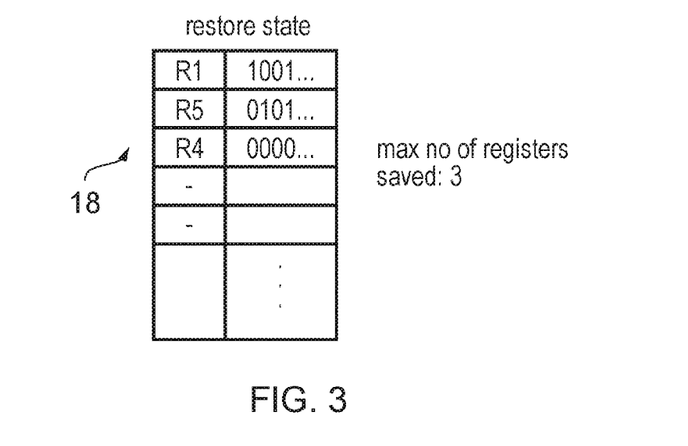
FIG. 3 shows an example of monitoring utilization of state restoration storage.

FIG. 3 shows another example of tracking utilization of transactional processing resource. The restoration state storage 18 may include a number of locations for storing restoration data for restoring state to corresponding registers 8. The monitoring circuitry 30 may maintain a count of how many registers have had their state saved to the restoration state storage 18 (e.g. 3 registers in this example).

Figure 4:
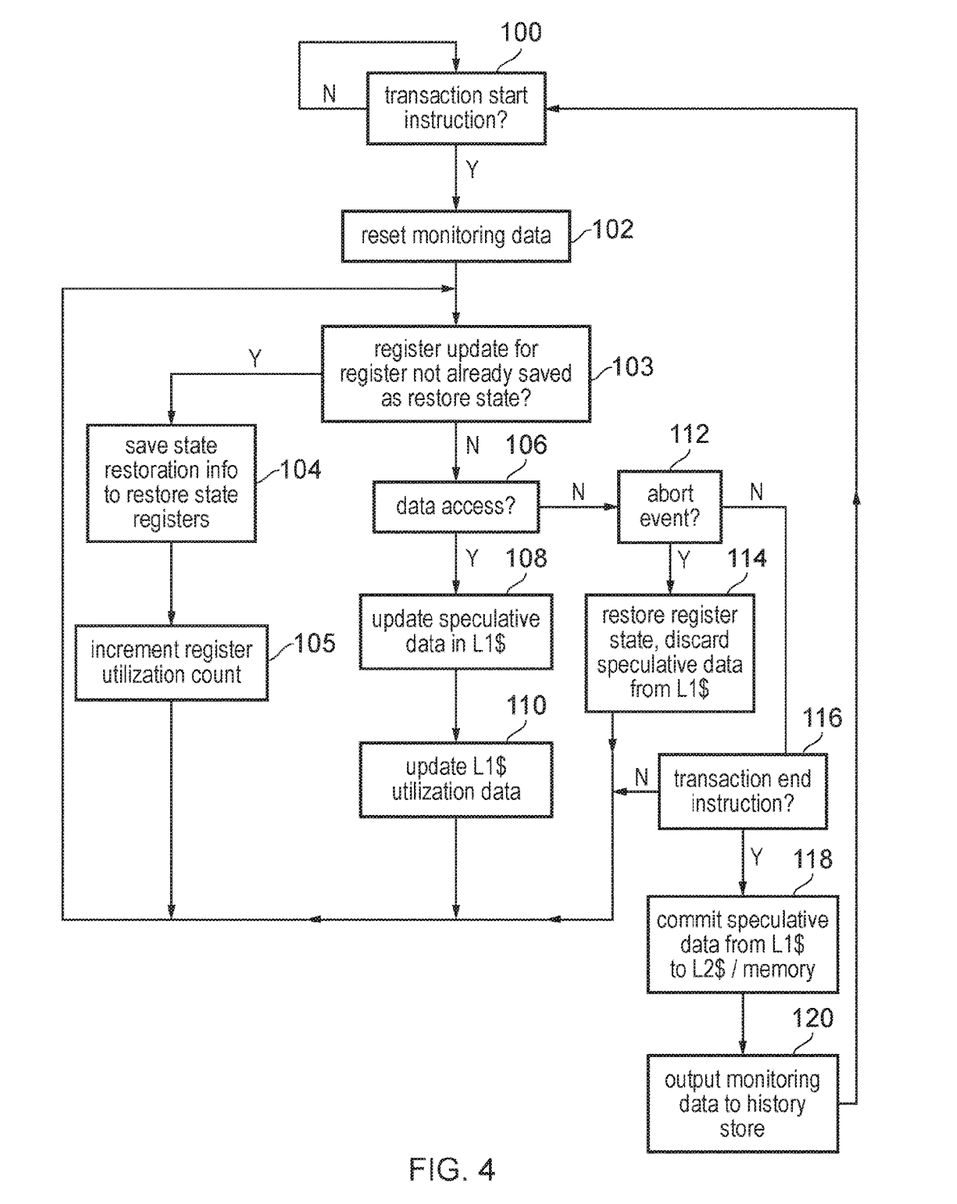
FIG. 4 illustrates a method of processing transactions.

FIG. 4 illustrates a method of processing transactions using a given processing element, while capturing monitoring data indicating utilization of transactional processing resources. At step 100, a transaction start instruction is encountered marking the start of a transaction. At step 102, the monitoring data captured by the monitoring circuit 30 for a preceding transaction is reset so that monitoring starts again for the current transaction.

At step 103 it is determined whether the processing circuitry 6 is to update one of the registers 8 that has not already been backed up to the state restoration storage 18. If so, then at step 104 the previous value of that register is saved to the restoration state storage 18. At step 105, the monitoring circuit 30 increments the register utilization count value indicating how many registers have had their state saved to the restoration state storage 18. The method then returns to step 103.

If there is no update to a register not already backed up to the restoration storage, then at step 106 it is determined whether there is a data access operation. If so, then at step 108 the L1 cache 10 is updated with speculative data based on the data access. For example, for a read (load) operation a data value may be fetched from memory and written to one of the registers 8 (which may trigger the state saving in the same way as described for steps 104, 105). For a store operation a data value from registers 8 may be stored in the L1 cache and marked as speculative, to prevent the data being written back to the L2 cache 12 or memory 14. At step 110 the monitoring circuit 30 updates the cache utilization information based on the usage of the L1 cache 10 for storing speculative data. For example, the monitoring circuitry 30 may update the data indicating the number of sets or ways used for speculative data, the total number of locations used, or the fraction of the speculative results which relate to read or write operations. The method then returns to the step 103.

If there is no data access, then at step 112 it is determined whether an abort event has occurred. If so, then at step 114 the registers 8 are restored with state data determined based on the information indicated in the restoration state storage 18, and any speculative data is discarded or invalidated from the L1 cache 10. The method then returns to step 103.

If no abort event has occurred, then at step 116 it is determined whether a transaction end instruction has been encountered. If not, the method returns to step 103. If a transaction end instruction is encountered, then at step 118 any speculative data in the L1 cache is committed and marked as non-speculative, and written back to the L2 cache 12 or memory 14 if necessary. The monitoring data captured by the monitoring circuit 30 is output to the monitoring history store 50 at step 120. The method then returns to step 100 to await the next transaction start instruction.

Hence, this approach allows the usage of transactional processing resources to be monitored during processing of transactions. It will be appreciated that the operations shown in the example of FIG. 4 are illustrative and may be performed in different order, or performed at least partly in parallel.

Figure 5:
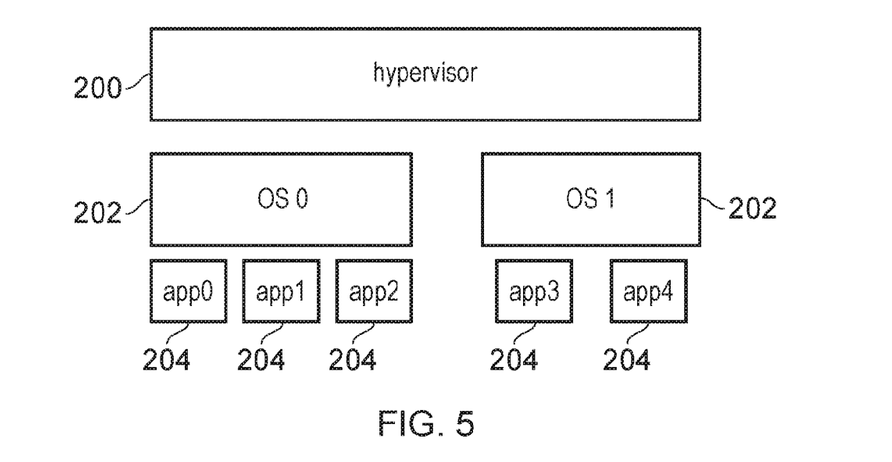
FIG. 5 illustrates an example of control programs executing on a processing element.

FIG. 5 shows an example of control software executing on one or both of the processing elements. For example the control software may include a hypervisor 200 which manages one or more guest operating systems 202. Each operating system 202 may control the processing element to execute one or more applications 204.

The application 204, operating system 202 or hypervisor 200 may use the monitoring data stored in the history store 50 to schedule operations. For example the monitoring data may be used to select which of the processing elements 4 to use to execute a given transaction. Also, the monitoring data may be used to determine whether a given set of data access operations should be performed as a transaction at all, or whether some other mechanism, such as using locks, should be used.

Figure 6:
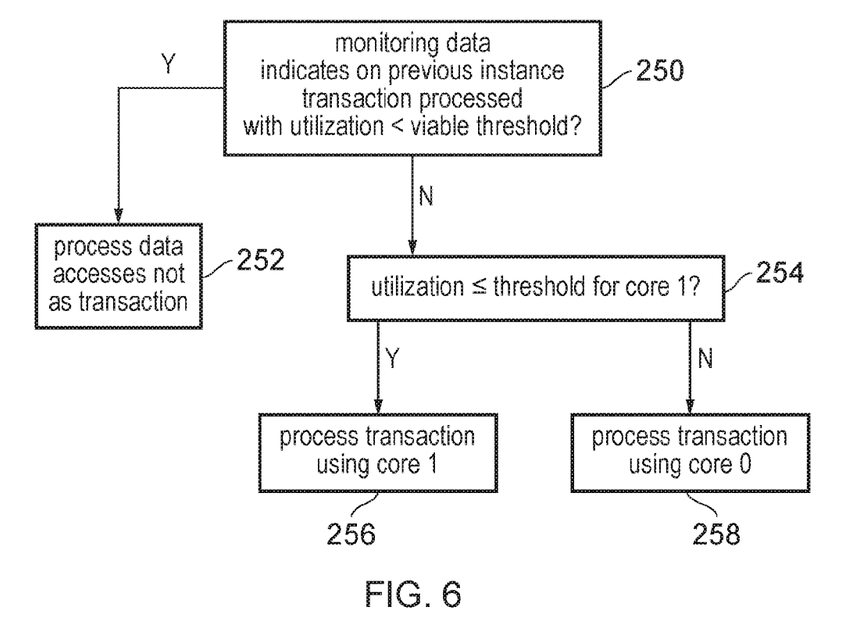
FIG. 6 illustrates a method of scheduling processing of transactions based on monitoring data.

FIG. 6 shows an example of a method of scheduling operations using a control program (which may be the application 204, operating system 202 or hypervisor 200 for example). At step 250, the control program determines whether the monitoring data indicates that, on a previous instance of execution, a transaction was processed with a resource utilization less than a predetermined viability threshold. It so, then at step 252 the control program may schedule a subsequent execution of the required operations using a mechanism which does not require the transactional processing resources (e.g. a locking mechanism). Hence, the monitoring data can be used to identify which code is likely to benefit from being run as a transaction, and schedule transactions or non-transaction operations accordingly.

If the resource utilization is greater than the viability threshold, then at step 254 the control program may determine whether the resource utilization is less than (or equal to) a first threshold corresponding to an amount of resource available to processing element 4-1. If so, then at step 256 the transaction can be scheduled using processing element 4-1. If the resource utilization was greater than the first threshold, then the transaction can be scheduled using processing element 4-0 which may have greater resource available. In this way, if the transaction requires small enough resource that it can be processed using the processing element 4-1, then this processing element 4-1 can carry out the transaction, while processing element 4-0 can be reserved for transactions requiring more resource. The utilization thresholds considered at steps 250 and 254 may be determined based on the configuration data stored in registers 16 for each processing element, indicating what resources are available to that processing element.

While FIG. 6 shows a comparison of the utilization with a single threshold, in practice there may be several aspects of the utilization to consider, such as whether the cache has enough space or associativity for handling the transaction, and whether the restoration storage 18 has sufficient capacity. Therefore, in some cases there may be several criteria to be satisfied by the monitoring data in order to schedule the transaction for processing on a given processing element. The heuristics for scheduling transactions may in some cases be more complex than the simplified example shown in FIG. 6. In general, the monitoring data may feed into such heuristics in any way depending on the needs of the system designer.

As shown in FIG. 1, another use for the monitoring data may be to provide monitoring data to a debug interface 300 which may output the monitoring output to a debugger. For example, the debugger may determine the cause of an abort of a transaction based on a monitoring data, which may help determine whether the abort was caused by there being insufficient transactional processing resource.

In summary, transactional memory requires additional hardware resources to track a transaction's speculative state (e.g. memory reads and writes and architectural register state). In a heterogeneous system the capacity of these resources may vary amongst the processing elements (PEs).

As an example, consider the L1 cache. The L1 cache may be used during a transaction as a means of maintaining speculative memory state such that any memory writes during a transaction are only allowed to update values held in a processing elements local L1 cache, and therefore are annotated as being speculative to avoid them being written back to memory, and becoming visible to other PEs. If a memory operation occurs during a transaction that requires the eviction of a speculatively annotated line from the L1 cache then the transaction may abort as it can no longer track interactions with other memory operations from PEs. A transaction that aborts due to an eviction of speculative state is said to have aborted due to insufficient capacity. In a heterogeneous system, capacity can differ amongst PEs and therefore "insufficient capacity" may not be sufficient in understanding whether a transaction can complete on any of the other PEs.

Conversely a transaction may complete on a well-resourced PE but not use the full capacity of the resources available. This transaction may be able to run on a PE with fewer hardware resources.

By adding a number of counters/hints that can be used to understand how well a transaction fits a PE, these hints can be used by software heuristics to determine where to schedule a transaction in subsequent executions, or whether or not to attempt to retry the transaction or fall back to a locking code.

Considering the example of the L1 cache the system may hint at the following:
  utilization-sets, possibly implemented as a number between 0 and the number of sets in the cache.
  utilization-ways, possibly implemented as a number between 0 and the number of ways in the cache.
Given these two numbers, a transaction that is under utilizing the cache may be attempted on a subsequent run on a PE with a smaller cache. If the resource is over-utilized, but the transaction is resident on a core with fewer resources the OS/application may wish to target a core with more resources (e.g. larger/wider set-associative cache L1 cache) and re-attempt the transaction.

It may also be possible to use the resource hints outside of a speculative transaction, for example keep track of speculative state in the caches, use this state to update the resource utilization, and use the utilization information to determine whether the code is likely to benefit from being run transactionally. For example, one could start with locking as the default scenario and boost those transactions that fit the constraints of the transactional memory resources. With this knowledge an OS/application may wish to group and hold back transactions such that throughput is increased.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the claims are not limited to those precise embodiments, and that various changes and modifications can be effected therein by one skilled in the art without departing from the scope defined by the appended claims.

The invention claimed is:

1. An apparatus comprising:
a processing element to perform data access operations to access data from at least one storage device;
wherein the processing element has at least one transactional processing resource supporting processing of a speculative transaction in which the data access operations performed following a transaction start event are performed speculatively and results of the speculatively performed data access operations are committed in response to a transaction end event;
the apparatus comprises monitoring circuitry to capture monitoring data indicative of how much of said at least one transactional processing resource is used when processing said data access operations performed speculatively between the transaction start event and the transaction end event for said speculative transaction; and
the apparatus is configured to provide said monitoring data to at least one of software executing on the processing element and debugging circuitry.

2. The apparatus according to claim 1, comprising a plurality of processing elements.

3. The apparatus according to claim 2, wherein the plurality of processing elements have different amounts of transactional processing resource.

4. The apparatus according to claim 3, comprising at least one storage element to store data identifying an amount of transactional processing resource provided for each of the plurality of processing elements.

5. The apparatus according to claim 2, wherein a control program executing on at least one of the plurality of processing elements is configured to schedule processing of speculative transactions by the plurality of processing elements in dependence on the monitoring data captured by the monitoring circuitry.

6. The apparatus according to claim 5, wherein the control program is to select which of the plurality of processing elements should process a selected speculative transaction in dependence on the monitoring data.

7. The apparatus according to claim 5, wherein when the monitoring data indicates that on a previous instance of processing a selected speculative transaction using a first processing element the utilization of the at least one transactional processing resource by the first processing element was less than a predetermined threshold, the control program is configured to schedule a subsequent instance of processing of the selected speculative transaction using a second processing element having less transactional processing resource than the first processing element.

8. The apparatus according to claim 1, wherein a control program executing on the processing element or a further processing element is configured to determine whether a group of data access operations should be processed as a speculative transaction using said at least one transactional processing resource, in dependence on the monitoring data captured by the monitoring circuitry.

9. The apparatus according to claim 1, comprising at least one of a debug data store to store the monitoring data for external access by a debugger, and a debug interface to output at least some of the monitoring data to the debugger.

10. The apparatus according to claim 1, wherein the at least one transactional processing resource comprises speculative result tracking circuitry to store tracking data indicative of said results of the speculatively performed data access operations.

11. The apparatus according to claim 10, wherein the speculative result tracking circuitry comprises a set-associative cache, and the monitoring data is indicative of at least one of:
a number of sets of the set-associative cache used for storing said tracking data; and
a number of ways within the same set of the set-associative cache used for storing said tracking data.

12. The apparatus according to claim 10, wherein the monitoring data is indicative of how many storage locations of the speculative result tracking circuitry are used for storing said tracking data.

13. The apparatus according to claim 10, wherein the monitoring data is indicative of an amount of the tracking data which is indicative of results of speculative read operations, or an amount of the tracking data which is indicative of results of speculative write operations.

14. The apparatus according to claim 1, wherein the processing element has a plurality of state storage elements; and
the at least one transactional processing resource comprise restoration storage circuitry to store restoration data indicative of state data stored in at least one of the state storage elements of the processing element when the transaction start event occurred.

15. The apparatus according to claim 14, wherein when an abort event occurs before the transaction end event, the processing element is to perform a state restoration operation to restore state data to said at least one of the state storage elements based on the restoration data stored in the restoration storage circuitry.

16. The apparatus according to claim 14, wherein the monitoring data is indicative of a number of state storage elements for which restoration state data has been stored in the restoration storage circuitry.

17. The apparatus according to claim 1, wherein the processing element is configured to reverse changes caused by the speculatively performed data access operations when an abort event occurs before the transaction end event.

18. The apparatus according to claim 17, wherein the processing element is configured to trigger the abort event if the monitoring data captured by the monitoring circuitry satisfies a predetermined condition.

19. The apparatus according to claim 17, wherein the processing element is configured to trigger the abort event if the speculative transaction requires more transactional processing resource than is provided for the processing element.

20. A data processing method comprising:
in response to a transaction start event indicating a start of a speculative transaction, speculatively performing one or more data access operations for accessing data in at least one storage device;
in response to a transaction end event indicating an end of the speculative transaction, committing results of the speculatively performed data access operations of the transaction;
capturing monitoring data indicative of how much of at least one transactional processing resource is used during processing of the data access operations performed speculatively between the transaction start event and the transaction end event for said speculative transaction; and providing said monitoring data to at least one of software executing on a data processing element and debugging circuitry.

21. An apparatus comprising:

a processing element to perform data access operations to access data from at least one storage device;

a plurality of state storage elements to store state data; and restoration storage circuitry to store restoration data for restoring previous state data to at least one of the state storage elements;

wherein the processing element supports processing of a transaction in which the data access operations performed following a transaction start event are performed speculatively, results of the speculatively performed data access operations are committed in response to a transaction end event, and when an abort event occurs before the transaction end event, a restoration operation is performed to restore the previous state data to said at least one of the state storage elements based on the restoration data stored in the restoration storage circuitry;

wherein the restoration storage circuitry has capacity for storing restoration data for fewer state storage elements than the total number of said plurality of state storage elements.

22. A data processing method for an apparatus comprising a plurality of state storage elements, the method comprising:

in response to a transaction start event indicating a start of a transaction, speculatively performing one or more data access operations for accessing data in at least one storage device;

storing restoration data for restoring previous state data to at least one of the state storage elements;

in response to a transaction end event indicating an end of the transaction, committing results of the speculatively performed data access operations of the transaction; and when an abort event occurs before the transaction end event, performing a restoration operation using the restoration data to restore the previous state data to said at least one of the state storage elements;

wherein restoration storage circuitry for storing the restoration data has capacity for storing restoration data for fewer state storage elements than the total number of said plurality of state storage elements.

* * * * *